(12) United States Patent
Aronstam (10) Patent No.: US 8,941,278 B2
(45) Date of Patent: Jan. 27, 2015

(54) METHOD AND APPARATUS FOR HYBRID SUSPENSION SYSTEM

(76) Inventor: Peter S. Aronstam, Houston, TX (US)

(*) Notice: Subject to any disclaimer, the term of this patent is extended or adjusted under 35 U.S.C. 154(b) by 594 days.

(21) Appl. No.: 13/185,418

(22) Filed: Jul. 18, 2011

(65) Prior Publication Data

US 2012/0013215 A1 Jan. 19, 2012

Related U.S. Application Data (60) Provisional application No. 61/365,691, filed on Jul. 19, 2010.

(51) Int. Cl.
*H02K 7/09* (2006.01)
*F16C 32/04* (2006.01)

(52) U.S. Cl.
CPC ......... *F16C 32/0423* (2013.01); *F16C 32/0402* (2013.01)
USPC ............................................. 310/90.5; 310/90

(58) Field of Classification Search
USPC ..................... 310/90, 90.5; 384/282, 284, 285
See application file for complete search history.

(56) References Cited

U.S. PATENT DOCUMENTS

| | | | | |
|---|---|---|---|---|
| 3,221,389 A | * | 12/1965 | Cowell | 19/288 |
| 4,065,234 A | * | 12/1977 | Yoshiyuki et al. | 417/420 |
| 4,756,631 A | | 7/1988 | Jones | |
| 5,559,381 A | * | 9/1996 | Bosley et al. | 310/74 |
| 5,587,617 A | * | 12/1996 | Dunfield et al. | 310/90.5 |
| 5,627,421 A | * | 5/1997 | Miller et al. | 310/90.5 |
| 5,834,870 A | * | 11/1998 | Tokushima et al. | 310/90 |
| 5,856,719 A | * | 1/1999 | De Armas | 310/103 |
| 5,867,979 A | * | 2/1999 | Newton et al. | 60/226.1 |
| 6,215,218 B1 | * | 4/2001 | Ueyama | 310/90.5 |
| 6,218,751 B1 | * | 4/2001 | Bohlin | 310/90.5 |
| 6,340,854 B1 | * | 1/2002 | Jeong | 310/90 |
| 6,420,810 B1 | * | 7/2002 | Jeong | 310/90.5 |
| 6,710,489 B1 | * | 3/2004 | Gabrys | 310/90.5 |
| 2001/0048257 A1 | * | 12/2001 | Suzuki et al. | 310/90.5 |
| 2003/0015930 A1 | * | 1/2003 | Ichiyama | 310/90.5 |
| 2003/0155830 A1 | * | 8/2003 | Beyer et al. | 310/90.5 |
| 2004/0190804 A1 | * | 9/2004 | John et al. | 384/420 |
| 2007/0081749 A1 | | 4/2007 | Sexton et al. | |
| 2011/0291507 A1 | * | 12/2011 | Post | 310/90.5 |

FOREIGN PATENT DOCUMENTS

| | | |
|---|---|---|
| DE | 20 2010 002 867 | 7/2010 |
| EP | 1 770 284 | 4/2007 |

OTHER PUBLICATIONS

PCT/US2011/044575 International Search Report (Oct. 7, 2011).

* cited by examiner

*Primary Examiner* — Quyen Leung
*Assistant Examiner* — Naishadh Desai
(74) *Attorney, Agent, or Firm* — Clayton, McKay & Bailey, PC (57) ABSTRACT

A system for suspending a rotating body consisting of a combination of magnetic and engineered materials. The suspension system allows for some axial motion to account for varying system loads.

18 Claims, 9 Drawing Sheets

METHOD AND APPARATUS FOR HYBRID SUSPENSION SYSTEM

CROSS-REFERENCE TO RELATED APPLICATIONS

This application claims benefit of U.S. provisional patent application Ser. No. 61/365,691, filed Jul. 19, 2010, which is herein incorporated by reference.

BACKGROUND OF THE INVENTION

1. Field of the Invention

This invention relates to the suspension of rotating structures. More particularly, the invention relates to both radial and axial stability with a minimum of rotating resistance.

2. Description of the Related Art

Historically, rotating structures have been supported by a series of radial and axial thrust bearings placed along and at the ends of the rotating assembly. Both radial and axial thrust bearings have typically been supplied by a roller bearing technology. Although quite successful for terrestrial clean environments, this technology fails in harsh fluid environments.

Figure 1:
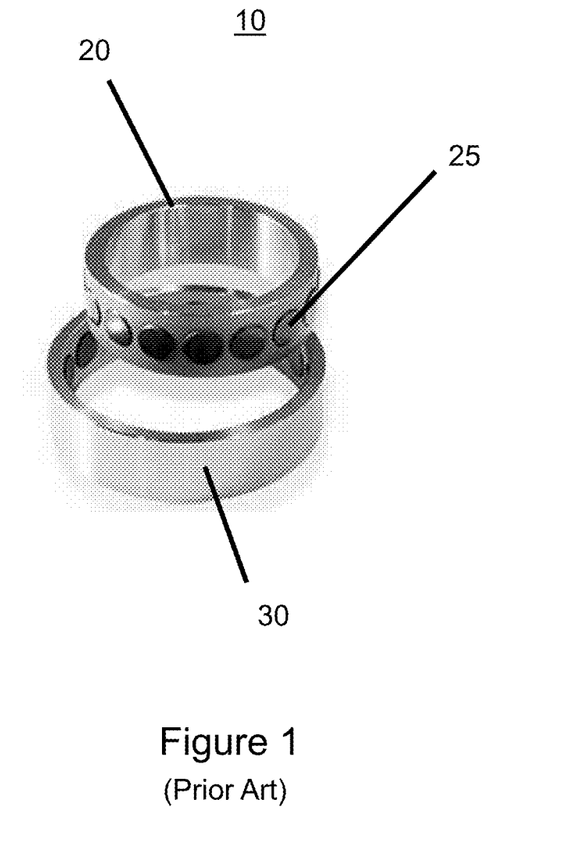
FIG. 1 is a view illustrating a conventional radial bearing assembly.

Recently a new class of bearing has been introduced which replaces the earlier roller technology with engineered materials such as ceramic and diamond. These bearings are designed to run against each other for long periods of time in harsh environments. FIG. 1 is a view of a radial bearing assembly 10 with engineered materials. The radial bearing assembly 10 includes an inner race 20 and an outer race 30 that are lined with one row of manufactured diamond buttons 25. When the inner race 20 is placed within the outer race 30 the manufactured diamond buttons 25 run against each other. As shown, the manufactured diamond buttons 25 on the inner race 20 and the outer race 30 are the same size (e.g., diameter). Although the manufactured diamond buttons 25 are specifically chosen to minimize friction, they still have friction which is a function of the applied load and, for this reason, are not applicable in all applications.

SUMMARY OF THE INVENTION

This invention generally relates to the suspension of rotating structures. In one aspect, a suspension system for use with rotating machinery is provided. The suspension system includes a first suspension assembly disposed between an inner structure and an outer structure of the rotating machinery for providing axial support. The first suspension assembly comprises an array of magnets. The suspension system further includes a second suspension assembly disposed between the structures for providing radial support. The second suspension assembly comprises at least one bearing member disposed between an inner portion and an outer portion.

In another aspect, a method of supporting an inner structure and an outer structure of rotating machinery is provided. The outer structure is configured to rotate relative to the inner structure. The method includes the step of providing a first suspension assembly between the inner structure and the outer structure for axially supporting the structures. The first suspension assembly comprises an array of magnets. The method further includes the step of providing a second suspension assembly for radially supporting the structures. The second suspension assembly comprises a bearing member.

In yet a further aspect, a rotating assembly is provided. The rotating assembly includes an inner structure and an outer structure, wherein the outer structure rotates relative to the inner structure. The rotating assembly further includes a first suspension assembly comprising an array of magnets for providing axial support to the structures. Additionally, the rotating assembly includes a second suspension assembly comprising an outer portion, an inner portion and at least one bearing member for providing radial support to the structures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

This present invention generally relates to a method of suspension of rotating structures utilizing both engineered materials and magnetic material to optimize the system. Engineered materials are used in the radial direction where lateral forces are minimum, providing low friction losses, and magnetic material is used to create the axial suspension member where loads are high and variable, resulting in no friction contribution to the axial system. The present invention will be described herein in relation to rotating machinery, such as turbines, generators or any rotating shaft systems. It is to be understood, however, that the suspension assembly may also be used for other types of applications without departing from principles of the present invention. To better understand the novelty of the suspension assembly of the present invention and the methods of use thereof, reference is hereafter made to the accompanying drawings.

Figure 2:
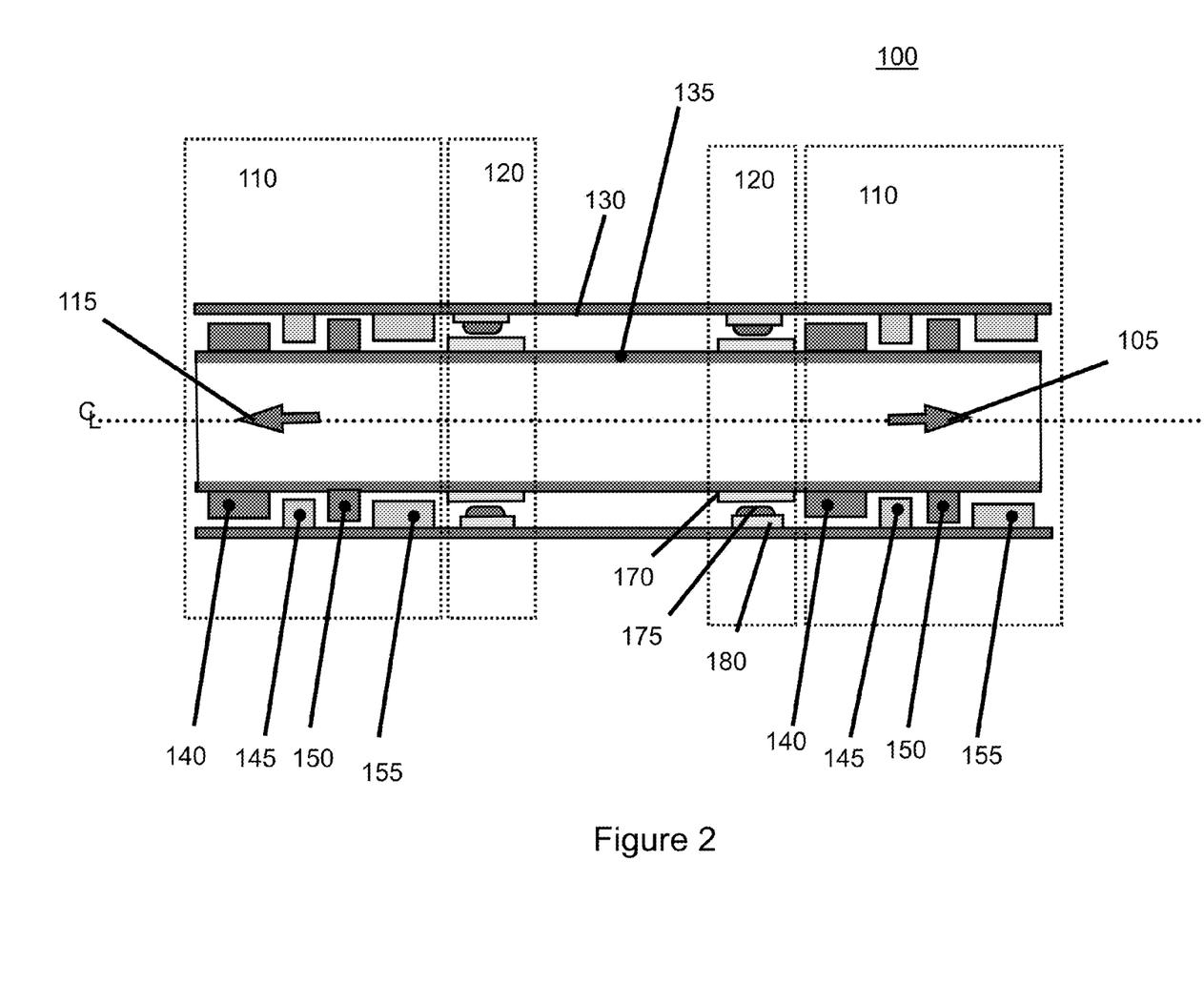
FIG. 2 is a view illustrating a hybrid suspension system.

FIG. 2 is a view illustrating a hybrid suspension system 100 according to one embodiment of the present invention. The hybrid suspension system 100 includes an axial bearing assembly 110 (e.g., first suspension assembly) and a radial bearing assembly 120 (e.g., second suspension assembly). The axial bearing assembly 110 is configured to provide support to the axial load of an outer structure 130. The radial bearing assembly 120 is configured to provide support to the radial load of the outer structure 130. In the embodiment shown in FIG. 2, the outer structure 130 rotates relative to an inner structure 135. In another embodiment, the inner structure 135 rotates relative to the outer structure 130. Further, as shown in FIG. 2, the hybrid suspension system 100 includes two axial bearing assemblies 110 and two radial bearing assemblies 120. It should be understood, however, that the hybrid suspension system 100 may have one or any number of axial bearing assemblies 110 and radial bearing assemblies 120, without departing from principles of the present invention.

The axial bearing assembly 110 includes an array of magnet members comprising a first magnet member 140, a second magnet member 145, a third magnet member 150 and a fourth magnet member 155. The first magnet member 140 and the third magnet member 150 are attached to the inner structure 135, and the second magnet member 145 and fourth magnet member 155 are attached to the outer structure 130. In an alternative embodiment, the first magnet member 140 and the third magnet member 150 are attached to the outer structure 130, and the second magnet member 145 and fourth magnet member 155 are attached to the inner structure 135. The magnet members 140, 145, 150, 155 are shown as rings with a rectangular cross-section. It should be understood, however, that the magnet members 140, 145, 150, 155 may have any geometrical shape and cross-section, without departing from principles of the present invention. The present invention depicts the use of permanent magnets, however the present invention can also use electromagnets or a combination of permanent and electromagnets. The combination of electromagnets allows for controlled axial positioning with variable loading.

Each magnet member 140, 145, 150, 155 in the axial bearing assembly 110 includes a north magnetic pole (N) and a south magnetic pole (S). The magnet members may be arranged such that the magnetic poles for adjacent magnet members are the same. For instance, the south magnetic pole of the first magnet member 140 is facing the south magnetic pole of the second magnet member 145, and as such a repulsive force is generated between the first and second magnet members 140, 145. A similar arrangement may be established between the other magnet members such that the magnet members may be effectively held in balance between the repulsive forces of the other magnet members. As a result, the magnet members are arranged such that the outer structure 130 is automatically centralized relative to the inner structure 135. However, upon application of an axial force that is greater than the repulsive forces of the magnet members, the structures 130, 135 will move in an axial direction relative to each other (see arrow 105 or arrow 115). The axial force may be generated by fluid flow through the hybrid suspension system 100 or any other means.

The array of magnet members in the axial bearing assembly 110 may be arranged in other configurations. For example, the magnet members may be selected and arranged such that the outer structure 130 requires an axial load to be centralized relative to the inner structure 135. In another example, the magnet members may be selected and arranged such that the outer structure 130 is automatically offset relative to the inner structure 135. In other words, magnetic directions, strength and face-to-face spacing would be chosen to yield the desired response of the outer structure 130. An example of an axial magnetic suspension is described in U.S. patent application Ser. No. 13/163,136 filed on Jun. 17, 2011, which is incorporated herein by reference.

As shown in FIG. 2, the radial bearing assembly 120 includes an inner portion 170 and an outer portion 180 having a plurality of bearing members 175. In the embodiment shown in FIG. 2, the inner portion 170 and the bearing members 175 are made from engineered materials, such as ceramic or diamond. The inner portion 170 is attached to the inner structure 135, and the outer portion 180 is attached to the outer structure 130. As described herein, the radial bearing assembly 120 is configured to maintain contact between the bearing members 175 and the inner portion 170 even as the outer structure 130 and the inner structure 135 move axially relative to each other (see arrow 105 or arrow 115).

Figures 3A, 3B:
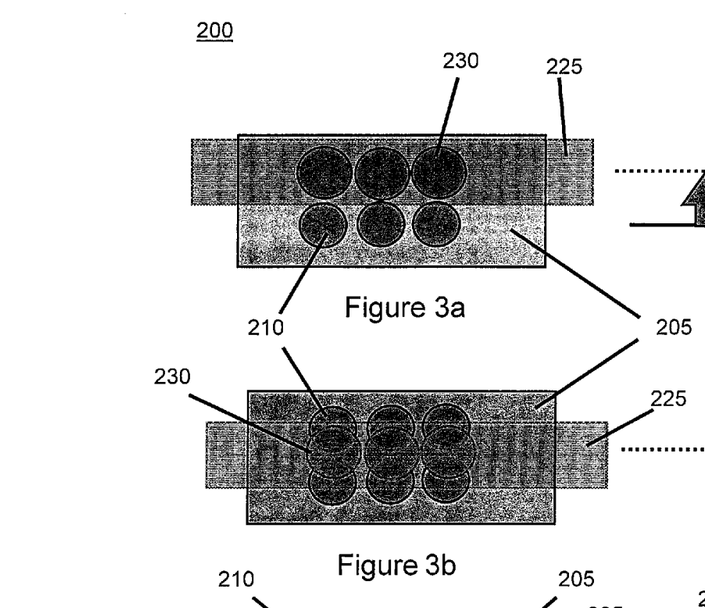
FIGS. 3a-3c are views illustrating a radial bearing assembly in the hybrid suspension system.
Figure 3C:
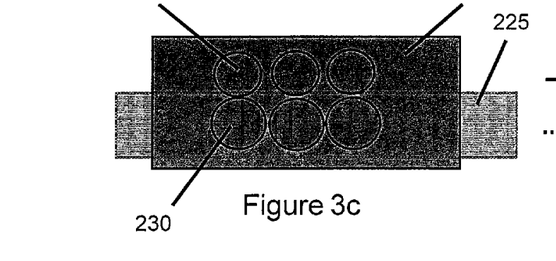

FIGS. 3a-3c are views illustrating a radial bearing assembly 200. The radial bearing 200 includes an inner portion 205 and an outer portion 225 that are shaped as a ring member similar to the radial bearing assembly 120 shown in FIG. 2. To illustrate the function of the radial bearing assembly 200, the inner portion 205 and the outer portion 210 have been flattened in FIGS. 3a-3c. The inner portion 205 includes a plurality of bearing members 210 having a first diameter, and the outer portion 225 includes a plurality of bearing members 230 having a second larger diameter. The inner portion 205 and the outer portion 225 are positioned such that the bearing members 210, 230 face each other. As shown, the inner portion 205 includes two rows of bearing members 210, and the outer portion 225 includes one row of bearing members 230. In another embodiment, the inner portion 205 includes one row of bearing members 210, and the outer portion 225 includes two rows of bearing members 230. Under no axial load, the outer portion 225 would be positioned as shown in FIG. 3b, riding over the center between two rows of bearing members 210 of the inner portion 205. As axial load is applied to the system, the inner portion 205 will move relative to the outer portion 225 in the direction away from the applied force, as shown in FIGS. 3a and 3c. As shown, the radial bearing assembly 200 allows continuous radial support throughout the range of axial motion allowed between the inner portion 205 and the outer portion 225.

Figure 4A:
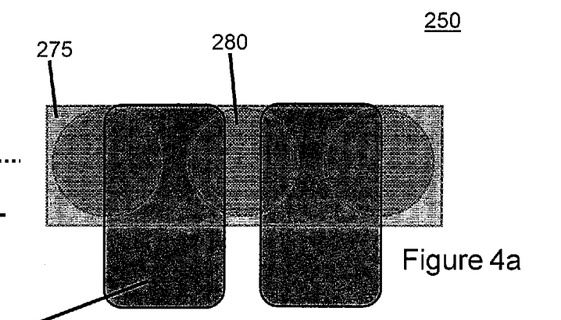
FIGS. 4a-4c are views illustrating a radial bearing assembly in the hybrid suspension system.
Figure 4B:
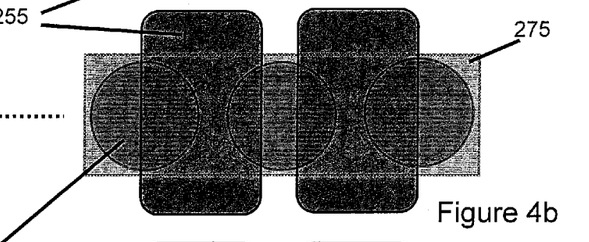
Figure 4C:
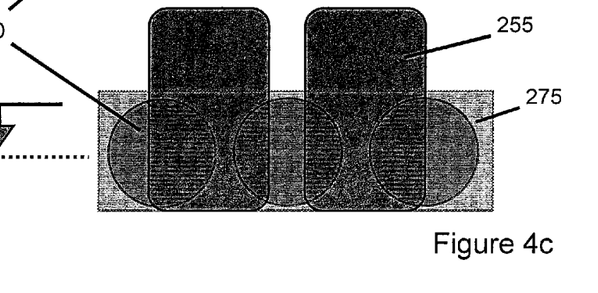

FIGS. 4a-4c are views illustrating a radial bearing assembly 250. The radial bearing 250 includes an inner portion in the form of a plurality of blocks 255 and an outer portion 275 having a plurality of bearing members 280. The blocks 255 and the bearing members 280 are made from engineering materials. The blocks 255 are configured to be attached to the inner structure 135 (see FIG. 2). To illustrate the function of the radial bearing assembly 250, the inner portion 255 and the blocks 255 have been flattened in FIGS. 4a-4c. The outer portion 275 is positioned such that the bearing members 280 face the blocks 255. As shown, the outer portion 275 includes one row of bearing members 280. Under no axial load, the outer portion 275 would be positioned as shown in FIG. 4b, riding over the center between the blocks 255. As axial load is applied to the system, the portion 275 can move in an axial direction (see arrow 105 or arrow 115) to positions as shown in FIGS. 4a and 4c. The radial bearing assembly 250 allows continuous radial support throughout the range of axial motion allowed between the blocks 255 and the outer portion 275.

Figures 5A, 5B:
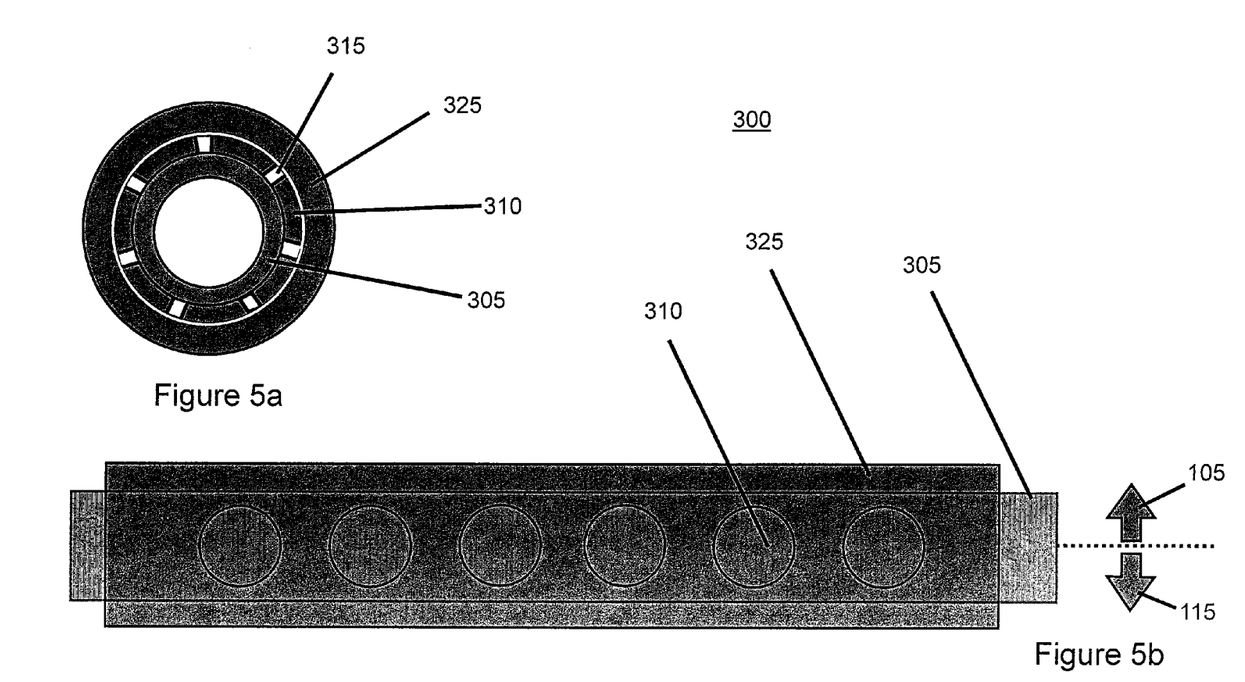
FIGS. 5a-5c are views illustrating a radial bearing assembly in the hybrid suspension system.
Figure 5C:
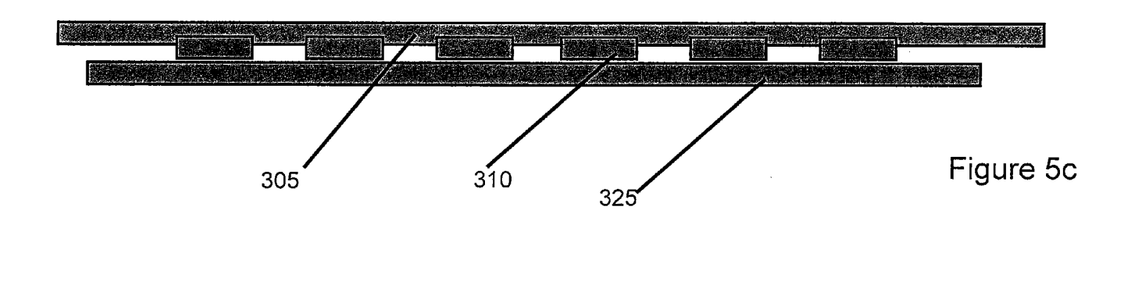

FIGS. 5a-5c are views illustrating a radial bearing assembly 300. The radial bearing 300 includes an inner portion 305 and an outer portion 325. The inner portion 305 includes a plurality of bearing members 310. As shown, the outer portion 325 is positioned such that the bearing members 310 of the inner portion 305 face the outer portion 325. The outer portion 325 is a continuous piece of hardened material upon which the bearing members 310 ride. Having the continuous piece of hardened material as the outer portion 325 can reduce manufacturing costs and complexity. In one embodiment, the bearing members 310 are diamond buttons, and the continuous outer portion 325 is silicon or tungsten carbide. A fluid pathway 315 is formed between the inner portion 305 and the outer portion 325. Fluid may be pumped through the fluid pathway 315 to lubricate, cool and/or clean the surfaces of the bearing members 310 and the outer portion 325.

To illustrate the function of the radial bearing assembly 30, the inner portion 305 and the outer portion 325 have been flattened in FIGS. 5b-5c. Under no axial load, the inner portion 305 would be positioned as shown in FIG. 5b, riding over the continuous outer portion 325. As axial load is applied to the system, the inner portion 305 will still be riding over the continuous outer portion 325. In a similar manner as the other embodiments, the radial bearing assembly 300 allows continuous radial support throughout the range of axial motion allowed between the inner portion 305 and the outer portion 325.

Figures 6A, 6B, 6C:
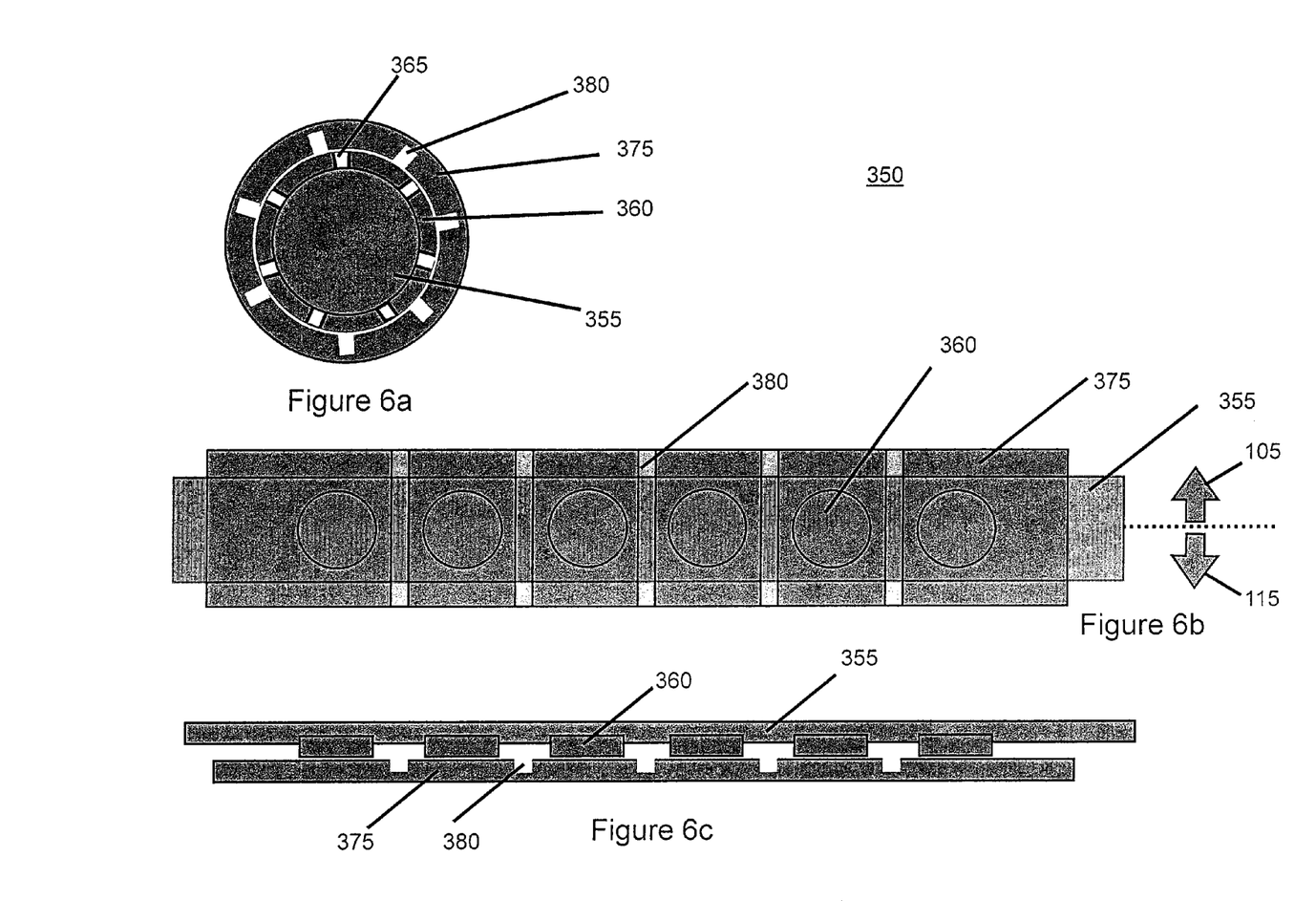
FIGS. 6a-6c are views illustrating a radial bearing assembly in the hybrid suspension system.

FIGS. 6a-6c are views illustrating a radial bearing assembly 350. The radial bearing assembly 350 includes an inner portion 355 and an outer portion 375. The inner portion 355 includes a plurality of bearing members 360. The outer portion 375 is a continuous piece of hardened material upon which the bearing members 360 ride. The outer portion 375 includes a plurality of grooves 380 formed along an inside surface thereof which are configured to act as a first fluid pathway. The first fluid pathway is interconnected with a second fluid pathway (e.g., gaps 365 between bearing members 360). Fluid may be pumped through the fluid pathways to lubricate, cool and/or clean the surfaces of the bearing members 360 and the outer portion 375. In another embodiment, the inner portion 355 includes a plurality of grooves which may be used as the first fluid pathway. As illustrated, the inner portion 355 is a solid piece. In another embodiment, the inner portion 355 includes a longitudinal bore. Under no axial load and an axial load, the inner portion 355 will ride over the continuous outer portion 325. In a similar manner as the other embodiments, the radial bearing assembly 350 allows continuous radial support throughout the range of axial motion allowed between the inner portion 355 and the outer portion 375.

Figures 7A, 7B:
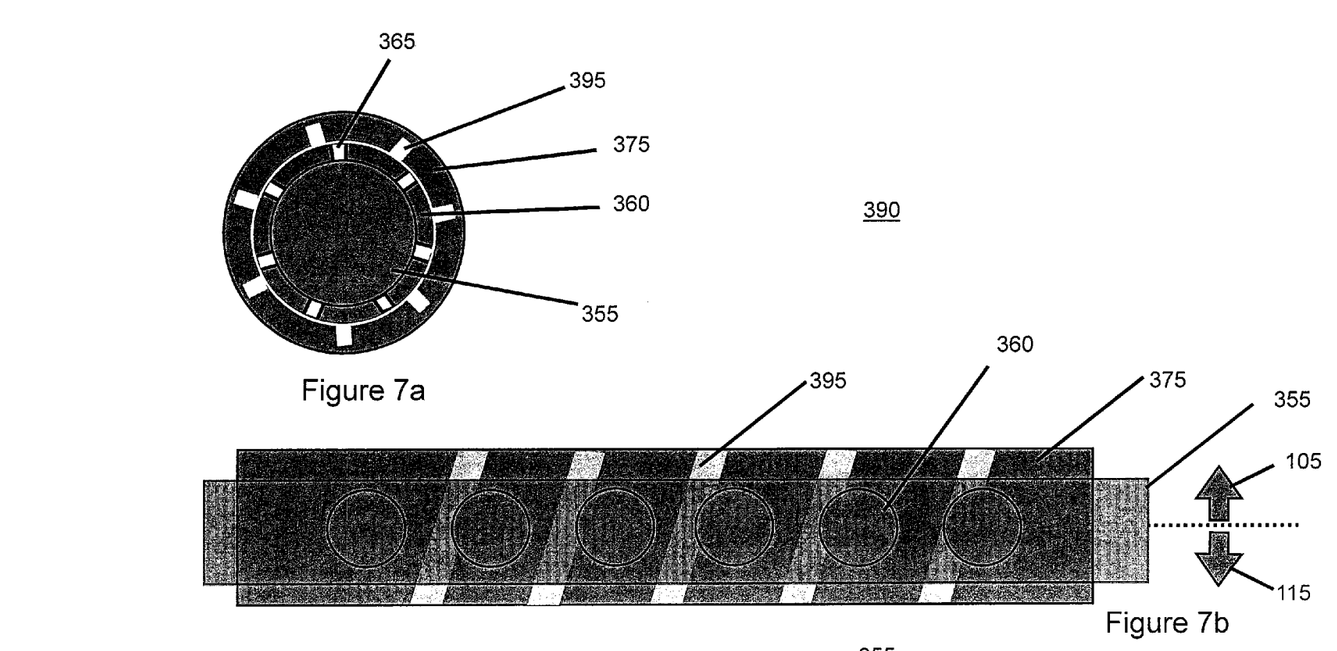
FIGS. 7a-7c are views illustrating a radial bearing assembly in the hybrid suspension system.
Figure 7C:
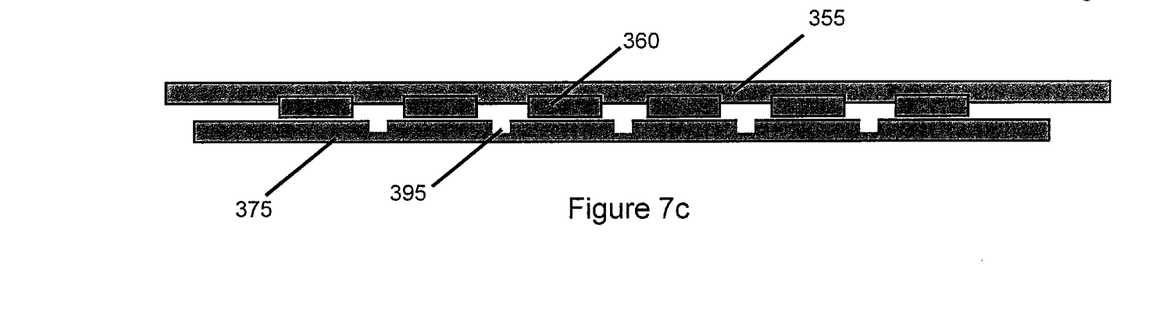

FIGS. 7a-7c are views illustrating a radial bearing assembly 390. For convenience, the components in the radial bearing assembly 390 that are similar to the components in radial bearing assembly 350 will be labeled with the same number indicator. As shown, the radial bearing assembly 390 includes the inner portion 355 and the outer portion 375. The outer portion 375 includes a plurality of grooves 395 that are formed at an angle relative to a longitudinal axis of the outer portion 375. In one embodiment, the angle of the grooves 395 is greater than 15 degrees, such as 30 degrees. In another embodiment, the angle of the grooves 395 is 45 degrees. Fluid may be pumped through the grooves 395 in the outer portion 375 to lubricate, cool and/or clean the surfaces of the bearing members 360 and the outer portion 375 as well as allow fluid energy to be converted into a rotational or tangential force. The generated force may be used to control the torsional stability of the radial bearing assembly 390 or in the case of a rotating application to support the rotational drive.

Figure 8:
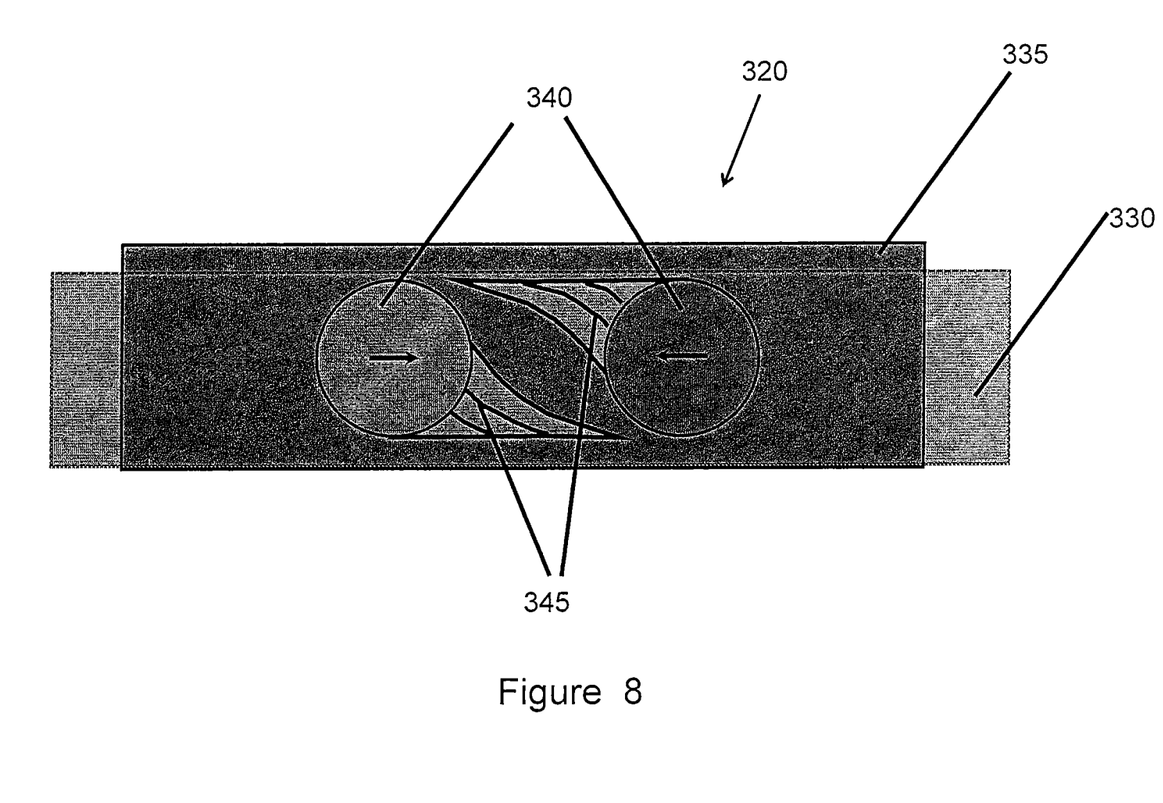
FIG. 8 is a view illustrating a lubrication system for use with the radial bearing assembly.

FIG. 8 is a view illustrating a lubrication system 320 for use with a radial bearing assembly. To minimize the wear of the mating surfaces in the radial bearing assembly, a fluid layer may be placed between the engineered surfaces and their mating race. In a sense, the surfaces of the radial bearing assembly hydroplane against each other, thus minimizing or eliminating wear. The lubrication system 320 may be used with each of the embodiments set forth herein. As shown, an inner portion 330 is disposed adjacent an outer portion 335 such that bearing members 340 on the portions 330, 335 face each other in a similar manner as described herein. Fluid compression ramps 345 are formed on the portions 330, 335 at the leading edge of the bearing members 340. As the bearing members 340 approach each other, the fluid becomes trapped between opposing fluid compression ramps 345 and is forced onto the bearing surface of the bearing members 340. Although there is some energy consumed by the fluid pumping, the increased bearing life can be important in many applications.

Figure 9:
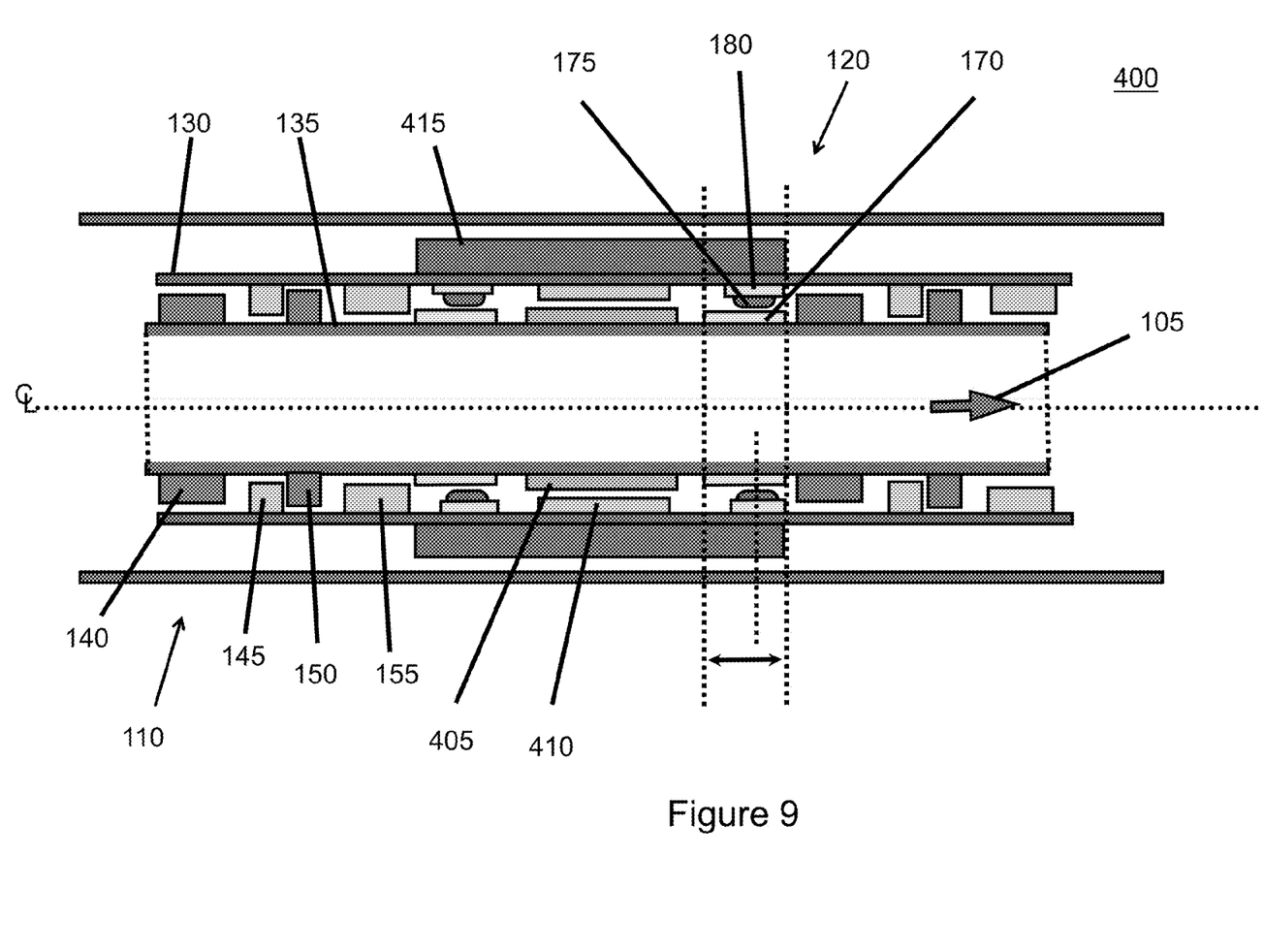
FIGS. 9 and 10 are views illustrating a rotating assembly that includes the hybrid suspension system.
Figure 10:
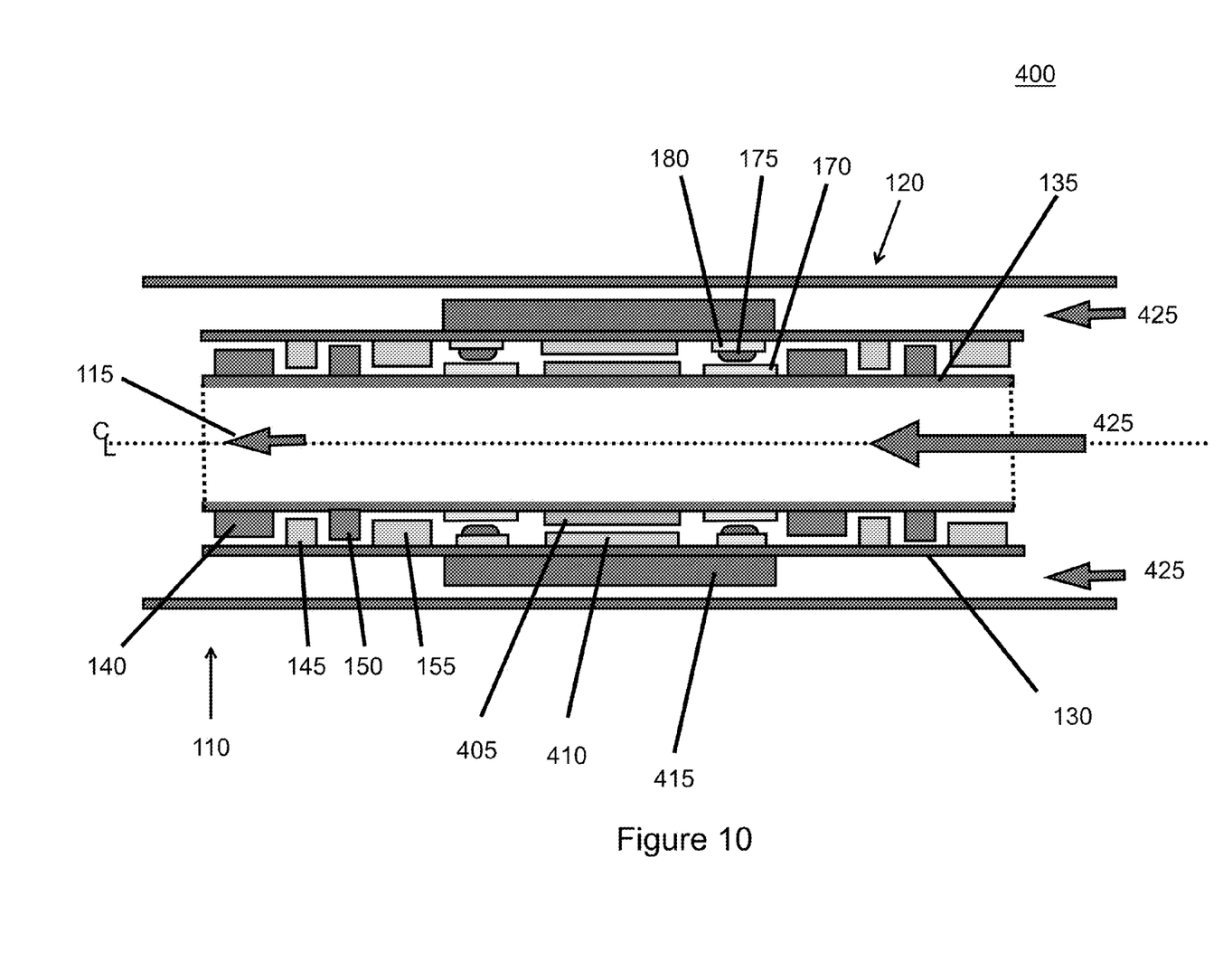

FIGS. 9 and 10 illustrate a rotating assembly 400 that includes the hybrid suspension system 100. FIG. 9 illustrates the rotating assembly 400 in the form of an electric generator in an off-position (e.g., without fluid flow), and FIG. 10 illustrates the electric generator in an on-position (e.g., with fluid flow). The rotating assembly 400 includes a plurality of coils 405 and field magnets 410 arrayed around the inner and outer structures 135, 130. The rotating assembly 400 further includes a plurality of vanes 415 disposed around the outer structure 130. The rotational motion of the outer structure 130 relative to the inner structure 135 is caused by the fluid flow impinging on the plurality of vanes 415.

As shown in FIG. 9, the outer structure 130 has moved in an axial direction illustrated by arrow 105 which causes the inner portion 170 of the radial bearing assembly 120 to move relative to the outer portion 180. The reason the outer structure 130 has moved in the axial direction illustrated by arrow 105 is because the magnetic directions, strength and face-to-face spacing of the magnet members 140, 145, 150, 155 in the axial bearing assembly 110 have been selected and arranged such that the outer structure 130 is automatically offset relative to the inner structure 135 when the rotating assembly 400 is in the off position (e.g., without fluid flow).

As shown in FIG. 10, fluid flow 425 is applied to the rotating assembly 400, which places the electric generator in the on-position. As the fluid flow 425 impinges on the plurality of vanes 415, the outer structure 130 rotates relative to the inner structure 135. As the outer structure 130 rotates, field magnets 410 alternately pass coils 405, thus generating an electric current in the coils, and such current is then drawn off for other useful purposes. This same fluid flow 425 applies a force to the outer structure 130, pushing it in the axial direction indicated by arrow 115. The axial bearings 110 adjust their balance position, shifting the operating point on the radial bearings 120 to the direction indicated by arrow 115. In FIG. 10, the radial bearings 120 are shown in their loaded position. In this manner the suspension system 100 can maintain the rotating assembly 400 through a wide range of variable flow conditions. To allow for the motion, the coils 405 in the rotating assembly 400 may be designed to be larger than the field magnets 410 to prevent any loss of electrical efficiency in the rotating assembly 400.

As with any magnetic bearing system there is a potential for axial oscillation and resonance. In the case illustrated in FIGS. 9 and 10, this instability can be managed by regulating the rate at which the fluid can leave the interstitial space between the inner structure 135 and the outer structure 130, by managing the size and the spacing of the gaps 365 between the bearing members 360 and/or the grooves 380 in the outer portion 375 (see FIG. 6a). For example, enlarging the widths of the gaps 365 and/or grooves 380 (or increasing the number of gaps 365 and/or grooves 380) fluid will flow more freely through the interstitial space between the inner structure 135 and the outer structure 130 which results in a decrease of damping of the axial oscillation and resonance of the axial bearing assembly 110. In contrast, decreasing the widths of the gaps 365 and/or grooves 380 (or decreasing the number of gaps 365 and/or grooves 380) there will be less fluid flow through the interstitial space between the inner structure 135 and the outer structure 130 which results in an increase of damping of the axial oscillation and resonance of the axial bearing assembly 110. In this manner, the axial oscillation and resonance of the magnetic axial bearing assembly 110 can be managed accordingly.

In the present examples, the outer structure 130 is designated as the rotating unit. In other embodiments, the outer structure 130 is fixed, allowing the inner structure 135 to rotate and placing the driving vanes on the inside of the inner structure 135.

There are numerous applications which can be attached to the connecting structures 130, 135 between the bearing structures 110, 120, including various sensor means. In an alternate embodiment, the suspension system 100 could also be used for linear axial support of a non-rotating structure.

In one aspect, a hybrid suspension system is provided. The hybrid suspension system includes a magnetic axial suspension, a radial suspension of engineered materials and interconnection structure allowing for useful work. In one embodiment, the radial suspension is diamond-on-diamond inserts. In another embodiment, the radial suspension consists of inserts running on a continuous race of hardened material. The continuous race is grooved to allow fluid to pass through the radial suspension. The continuous race has grooves machined at an angle to the axis to allow fluid pressure to alter the operating functionality. In a further embodiment, the radial suspension is diamond on silicon or tungsten carbide. In another embodiment, the radial suspension member has races of different widths allowing for motion in the axial direction without loss of function. In a further embodiment, fluid pumping ramps are used to maintain fluid on the bearing faces of the radial suspension. In another embodiment, the useful work is the generation of electricity. In a further embodiment, the useful work is a sensor means. In an additional embodiment, the application is linear axial support. In another embodiment, the application is support of rotating structures. In a further embodiment, the axial instability or oscillation is managed by regulating the flow of fluid in the suspension system.

While the foregoing is directed to embodiments of the present invention, other and further embodiments of the invention may be devised without departing from the basic scope thereof, and the scope thereof is determined by the claims that follow.

The invention claimed is:

1. A suspension system for use with rotating machinery, the system comprising:
a first suspension assembly disposed between an inner structure and an outer structure of the rotating machinery for providing axial support, the first suspension assembly comprising an array of magnets; and
a second suspension assembly disposed between the structures for providing radial support, the second suspension assembly comprising an inner portion in contact with the inner structure, an outer portion in contact with the outer structure, and at least one ceramic, diamond, or other non-metallic bearing member disposed between the inner portion and the outer portion, wherein the outer portion moves between a first axial position and a second axial position relative to the inner portion in response to receiving an axial load, wherein the inner portion includes a plurality of bearing members aligned in a row and the outer portion comprises a continuous piece of hardened material, wherein the outer portion includes a plurality of fluid pathways configured to supply fluid to the plurality of bearing members, and wherein the fluid pathways are grooves formed in an inner surface of the continuous piece of hardened material.

2. The suspension system of claim 1, wherein the array of magnets causes the outer structure to move axially relative to the inner structure, thereby causing the outer portion of the second bearing member to move between the first axial position and the second axial position relative to the inner portion, and wherein the at least one bearing member is made from ceramic.

3. The suspension system of claim 2, wherein the second suspension assembly allows continuous radial support throughout the range of axial motion allowed between the inner portion and the outer portion.

4. The suspension system of claim 1, wherein the at least one bearing member is attached to the outer portion.

5. The suspension system of claim 1, wherein the inner portion includes a plurality of bearing members having a circular shape with a first diameter and the outer portion includes a plurality of bearing members having a circular shape with a second larger diameter.

6. The suspension system of claim 5, wherein the plurality of bearing members on the outer portion are aligned in a row along an inner circumference of the outer portion and the plurality of bearing members on the inner portion are aligned is a first row and a second row along an outer circumference of the inner portion.

7. The suspension system of claim 1, wherein the outer portion includes a plurality of bearing members having circular shape and the inner portion comprises a plurality of block members.

8. The suspension system of claim 1, wherein a width of each groove and spacing between each pair of bearing members is selected to control the axial oscillation of the first suspension assembly.

9. The suspension system of claim 1, wherein the grooves are disposed at an angle relative to a longitudinal axis of the second suspension assembly.

10. The suspension system of claim 9, wherein the grooves are configured to allow fluid energy to be converted into a rotational force.

11. A method of supporting an inner structure and an outer structure of rotating machinery, the outer structure being configured to rotate relative to the inner structure, the method comprising:
providing a first suspension assembly between the inner structure and the outer structure for axially supporting the structures, the first suspension assembly comprising an array of magnets; and
providing a second suspension assembly for radially supporting the structures, the second suspension assembly comprising an inner portion in contact with the inner structure, an outer portion in contact with the outer structure, and a ceramic, diamond, or other non-metallic bearing member, wherein the outer portion moves between a first axial position and a second axial position relative to the inner portion in response to receiving an axial load, wherein the inner portion includes a plurality of bearing members aligned in a row and the outer portion comprises a continuous piece of hardened material, wherein the outer portion includes a plurality of fluid pathways configured to supply fluid to the plurality of bearing members, and wherein the fluid pathways are grooves formed in an inner surface of the continuous piece of hardened material.

12. The method of claim 11, wherein the array of magnets are configured to move the outer structure relative to the inner structure in a first direction to the first axial position.

13. The method of claim 12, wherein a fluid pressure applied to the outer structure causes the outer structure to move relative to the inner structure in a second opposite direction to a second axial position.

14. The method of claim 13, wherein the second suspension assembly is configured to provide radial support to the outer structure in the first axial position and the second axial position, and wherein the at least one bearing member is made from diamond.

15. A rotating assembly comprising:
an inner structure and an outer structure, wherein the outer structure rotates relative to the inner structure;
a first suspension assembly comprising an array of magnets for providing axial support to the structures; and
a second suspension assembly comprising an outer portion, an inner portion and at least one ceramic, diamond, or other non-metallic bearing member for providing radial support to the structures, wherein the outer portion moves between a first axial position and a second axial position relative to the inner portion in response to receiving an axial load, wherein the inner portion includes a plurality of bearing members aligned in a row and the outer portion comprises a continuous piece of hardened material, wherein the outer portion includes a plurality of fluid pathways configured to supply fluid to the plurality of bearing members, and wherein the fluid pathways are grooves formed in an inner surface of the continuous piece of hardened material.

16. The rotating assembly of claim 15, further comprising a plurality of coils and field magnets arrayed around the inner and outer structures for generating electric current as the outer structure rotates relative to the inner structure.

17. The rotating assembly of claim 15, further comprising a plurality of vanes disposed around the outer structure that are configured to cause the outer structure to rotate when fluid flow impinges on the plurality of vanes.

18. The rotating assembly of claim 15, wherein the outer portion includes a first array of bearings and the inner portion includes a second array of bearings.

* * * * *